(12) United States Patent
Moulin et al.

(10) Patent No.: US 10,425,233 B2
(45) Date of Patent: Sep. 24, 2019

(54) METHOD FOR AUTOMATICALLY VERIFYING A TARGET COMPUTER FILE WITH RESPECT TO A REFERENCE COMPUTER FILE

(71) Applicant: SCHNEIDER ELECTRIC INDUSTRIES SAS, Rueil Malmaison (FR)

(72) Inventors: Michel Moulin, Coublevie (FR); Osman Kocoglu, Gresy sur Aix (FR); Theo Deletang, Sept-Forges (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 162 days.

(21) Appl. No.: 15/400,443

(22) Filed: Jan. 6, 2017

(65) Prior Publication Data
US 2017/0295020 A1   Oct. 12, 2017

(30) Foreign Application Priority Data
Apr. 11, 2016   (FR) .................................... 16 53165

(51) Int. Cl.
*H04L 9/32* (2006.01)
*G06F 9/44* (2018.01)
(Continued)

(52) U.S. Cl.
CPC .............. *H04L 9/3236* (2013.01); *G06F 8/71* (2013.01); *G06F 16/137* (2019.01);
(Continued)

(58) Field of Classification Search
CPC ..... H04L 9/3236; H04L 9/3247; G06F 21/64; G06F 21/565; G06F 8/71; G06F 17/30109; G06F 17/30097
See application file for complete search history.

(56) References Cited

U.S. PATENT DOCUMENTS

| 5,454,000 A * | 9/1995 | Dorfman ................. G06F 11/10 714/52 |
| 2004/0054906 A1 * | 3/2004 | Carro ....................... G06F 21/64 713/171 |

(Continued)

OTHER PUBLICATIONS

French Search Report dated Jul. 25, 2016 in French Application 16 53165, filed on Apr. 11, 2016 (with Translation of Categories of cited documents).

*Primary Examiner* — Meng Li
(74) *Attorney, Agent, or Firm* — Oblon, McClelland, Maier & Neustadt, L.L.P.

(57) ABSTRACT

A method for verifying a target computer file with respect to a reference computer file, including defining a first area delimiting a portion of a reference file, and a second area delimiting a portion of a target file, the second area exhibiting the same size as the first area and being situated, inside the target file, at the same relative position with respect to the origin of this target file as the first area with respect to the origin of the reference file; calculating a first digital imprint, by applying a hash function solely to that portion of the reference file which is contained inside the first area to be tested; calculating a second digital imprint, by applying the same hash function solely to that portion of the target file which is contained inside the second area to be tested; comparing the first and second digital imprints.

12 Claims, 2 Drawing Sheets

(51) Int. Cl.
*G06F 16/13* (2019.01)
*G06F 16/14* (2019.01)
*G06F 8/71* (2018.01)
*G06F 21/56* (2013.01)
*G06F 21/64* (2013.01)

(52) U.S. Cl.
CPC .......... *G06F 16/152* (2019.01); *G06F 21/565* (2013.01); *G06F 21/64* (2013.01); *H04L 9/3247* (2013.01)

(56) References Cited

U.S. PATENT DOCUMENTS

| | | | |
|---|---|---|---|
| 2008/0168564 A1* | 7/2008 | Lerouge | G06F 21/64 726/26 |
| 2014/0006796 A1* | 1/2014 | Smith | G06F 21/00 713/187 |
| 2014/0181528 A1* | 6/2014 | Ram | G06F 21/64 713/176 |

* cited by examiner

METHOD FOR AUTOMATICALLY VERIFYING A TARGET COMPUTER FILE WITH RESPECT TO A REFERENCE COMPUTER FILE

The invention concerns a method for verification of a target computer file with respect to a reference computer file. The invention also concerns a data recording medium and an electronic computer for implementing this method. Finally, the invention concerns a testing tool comprising such an electronic computer.

Methods are known for automatically verifying a target computer file with respect to a reference computer file. For example, during the manufacture of electronic devices which contain an embedded software in a memory it is known to automatically verify the memory contents to make sure that the embedded software conforms to a reference version of this software. In particular, it is important to verify that an attacker has not fraudulently substituted a falsified software for the installed embedded software during the manufacturing process. Such a substitution, if not detected, may have serious consequences for the operation of the device. However, in the course of an industrial manufacturing process, it is not always possible to devote a lot of time to such verification operations, by virtue of the large number of devices being tested and the considerable pace of the manufacturing and/or testing sequence. The time dedicated to carrying out testing operations for each item is thus reduced. Typically, it is not desirable, within the allotted time, to read all of the embedded software and compare it, byte by byte, with the reference version or calculate its signature. To save on time, it is known how to automatically calculate a check sum of the embedded software, with the aid of a CRC or "cyclical redundancy check" function and to compare the check sum calculated for the embedded software with a check sum calculated in the same way for the reference version of the software. If the two sums calculated show different values, this indicates that the embedded software has been modified with respect to the reference version installed. The calculation of such a check sum takes much less time than a complete comparison of the embedded software, which makes it advantageous for use in the context of an industrial manufacturing process for the device.

However, such a check sum does not afford satisfactory security. In fact, with the CRC functions typically used, an attacker may predict in advance the value which will be returned by the function depending on the data which is furnished at the input to this function. It is thus possible to replace the embedded software installed with a fraudulent software specially modified so that the check sum calculated will produce the anticipated value. Such a modification thus cannot be detected and the manufactured device may leave the production line with a falsified version of the software, which is not acceptable.

More particularly, these drawbacks are to be remedied by the invention, which proposes a method for automatically verifying a target computer file with respect to a reference computer file which has an increased resistance to security attacks while at the same time having a rapid speed of execution.

Accordingly, the invention concerns a method for automatically verifying a target computer file with respect to a reference computer file, this method being characterized in that it comprises the steps:

a) of acquiring a reference computer file and a computer file to be tested;

b) of acquiring at least one random variable;

c) of defining, as a function of the at least one random variable acquired:
   a first area to be tested delimiting a portion of the reference file, and
   a second area to be tested delimiting a portion of the target file, the second area to be tested exhibiting one and the same size as the first area to be tested and being situated, inside the target file, at the same relative position with respect to the origin of this target file as the first test area with respect to the origin of the reference file;

d) of calculating a first digital imprint, by applying a hash function solely to that portion of the reference file which is contained inside the first area to be tested;

e) of calculating a second digital imprint, by applying the same hash function solely to that portion of the target file which is contained inside the second area to be tested;

f) of automatically comparing the first and second digital imprints, the target file being termed verified if the first and second digital imprints are equal and being termed non-verified if the first and second digital imprints are different.

Thanks to the invention, by randomly selecting the size and the position of the first and second areas to be tested, it is not possible for the attacker to know in advance which portion of the target file will be the subject of the verification. It is thus physically impossible for them to modify in advance the target file so that the hash function returns the expected value of the second digital imprint, as they would have been able to do with the check sums of the prior art. Thus, a falsification of the target file cannot be concealed in this way. In fact, it has greater chances of being detected during the verification process. Thus, this method of verification provides an increased effectiveness and a high level of security. What is more, since it is not necessary to compare the entirety of the target file with the reference file, this method of verification can be carried out in a shorter time. It is thus compatible with the usual pace of the industrial production lines.

According to advantageous but not obligatory aspects of the invention, such a method of automatic verification may incorporate one or more of the following characteristics, used in any technically allowable combination:

The first area to be tested has a length equal to or greater than 10% of the total length of the reference file.

The method further involves:

b') the acquiring of at least one additional random variable;

c') the defining, as a function of the at least one additional random variable acquired:
   of a third area to be tested, different from the first area to be tested and delimiting an additional portion of the reference file, and
   of a fourth area to be tested, different from the second area to be tested and delimiting an additional portion of the target file, the fourth area to be tested having the same size as the third area to be tested and being situated, inside the target file, at the same relative position with respect to the origin of this target file as the third area to be tested with respect to the origin of the reference file;

d') the calculating of a third digital imprint, by applying a hash function solely to that portion of the reference file which is contained inside the third area to be tested;

e') the calculating of a fourth digital imprint, by applying the same hash function solely to that portion of the target file which is contained inside the fourth area to be tested;

f) the automatic comparison of the third and fourth digital imprints, the target file being then termed verified only if, moreover, the third and fourth digital imprints are equal.

The third and fourth areas to be tested occupy the entire length, respectively, of the reference file and the target file.

The third area to be tested is separate from the first area to be tested.

The joining of the third area to be tested and the first area to be tested occupies the entire length of the reference file.

Step a) moreover involves a verification of the authenticity of the reference file acquired, this verification of authenticity being done with the aid of a digital signature.

Steps a), b), c), d) and f) are executed automatically by a testing tool, in that the target file, such as an embedded software, is stored in a memory of a device to be tested, and in that the calculation of the second digital imprint is done automatically by the device to be tested, step e) then involving the automatic acquisition of the second digital imprint by the testing tool.

The hash function used to calculate the first and second digital imprints is a cryptographic hash function, such as a hash function of the family SHA-2 or SHA-3, preferably the hash function SHA-256.

According to another aspect, the invention concerns a recording medium containing instructions to carry out a method of verification according to any one of the preceding claims when these instructions are executed by an electronic computer.

According to another aspect, the invention concerns an electronic computer programmed to:

a) acquire a reference computer file and a computer file to be tested;

b) acquire at least one random variable;

c) define, as a function of the at least one random variable acquired:
   a first area to be tested delimiting a portion of the reference file, and
   a second area to be tested delimiting a portion of the target file, the second area to be tested exhibiting one and the same size as the first area to be tested and being situated, inside the target file, at the same relative position with respect to the origin of this target file as the first test area with respect to the origin of the reference file;

d) calculate a first digital imprint, by applying a hash function solely to that portion of the reference file which is contained inside the first area to be tested;

e) calculate a second digital imprint, by applying the same hash function solely to that portion of the target file which is contained inside the second area to be tested;

f) automatically compare the first and second digital imprints, the target file being termed verified if the first and second digital imprints are equal and being termed non-verified if the first and second digital imprints are different.

According to another aspect, the invention concerns a testing tool to automatically verify, with respect to a reference computer file, a target computer file, such as an embedded software, stored in a memory of a device to be tested, this testing tool comprising an electronic computer and a communication interface to exchange data with the memory of the device to be tested, this testing tool being characterized in that the electronic computer.

The invention will be better understood and further advantages thereof will appear more clearly in light of the following description of one embodiment of a method for automatic verification, given solely as an example and making reference to the enclosed drawings, in which.

Figure 1:
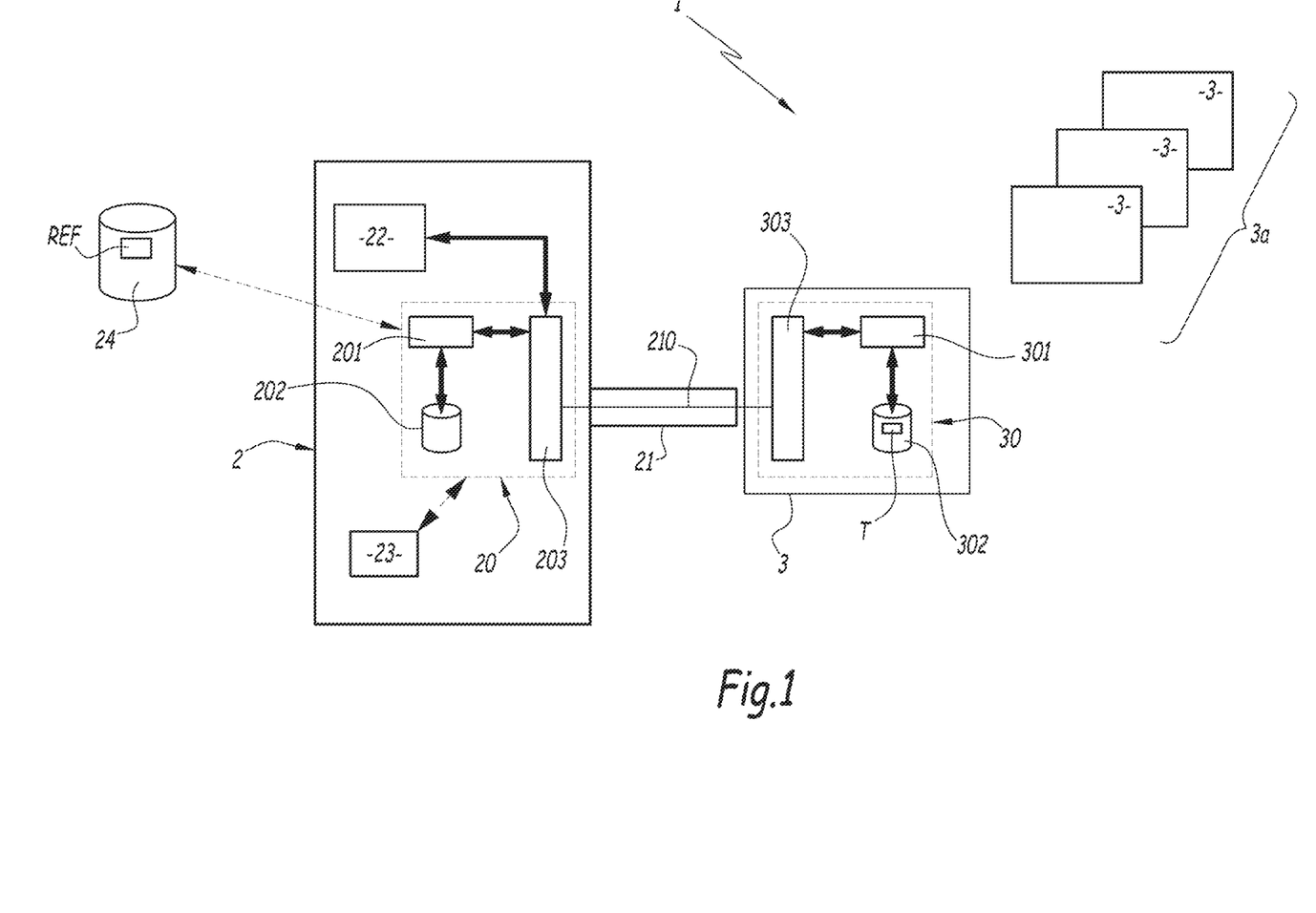
FIG. 1 is a schematic representation of an industrial facility for testing of a device, comprising a testing tool for implementing a method of verification of a computer file according to the invention.

FIG. 1 shows a testing facility 1 comprising a testing tool 2 and a series 3a of electronic devices to be tested 3.

Each device 3 comprises a programmable electronic computer 30, including here an arithmetic calculation unit 301, a memory 302 and a communication interface 303, joined together by a data bus, not illustrated. The computer 3 is programmed in particular to ensure the operation of the device 3. In this example, the device 3 is an electronically controllable circuit breaker.

The calculation unit 301 is a microprocessor or a programmable microcontroller. The memory 302 here is a non-volatile memory, such as a memory module of Flash or EEPROM technology. The interface 303 enables an exchanging of data between the computer 30 and the tool 2.

The memory 302 contains an embedded software T, which plays the role here of an operating system to enable the working of the device 3. In the rest of this description, this embedded software T is designated as a "target computer file". The target file T is stored here inside the memory 302, for example, after having been recorded there during a previous manufacturing step of the device 3.

As an illustrative example, the communication interface 303 here is of wired type and comprises a connector. As a variant, it may be a wireless interface.

The layout 1 has the purpose of testing the device 3 in order to verify that the target file T stored inside the memory 302 in fact corresponds to a "reference computer file", being designated here as REF. This reference file REF is, for example, the software which has been installed inside the memory 302 during the manufacture of the device 3. Thus, the layout 1 has the purpose of detecting whether the software installed in the memory 302 has undergone an unauthorized modification since its installation, the purpose being to prevent the device 3 from being delivered to a customer with a falsified version of the embedded software on board.

For this purpose, the testing tool 2 comprises here a programmable electronic computer 20, a connector 21, a user interface 22 and a random variable generator 23.

The electronic computer 20 includes an arithmetic calculation unit 201, a data recording medium 202 and a communication interface 203, joined together by a data bus, not shown. The arithmetic unit 201 is a microprocessor or a programmable microcontroller. The medium 202 comprises here a non-volatile memory, such as a memory module of Flash or EEPROM technology or a hard disk.

Figure 2:
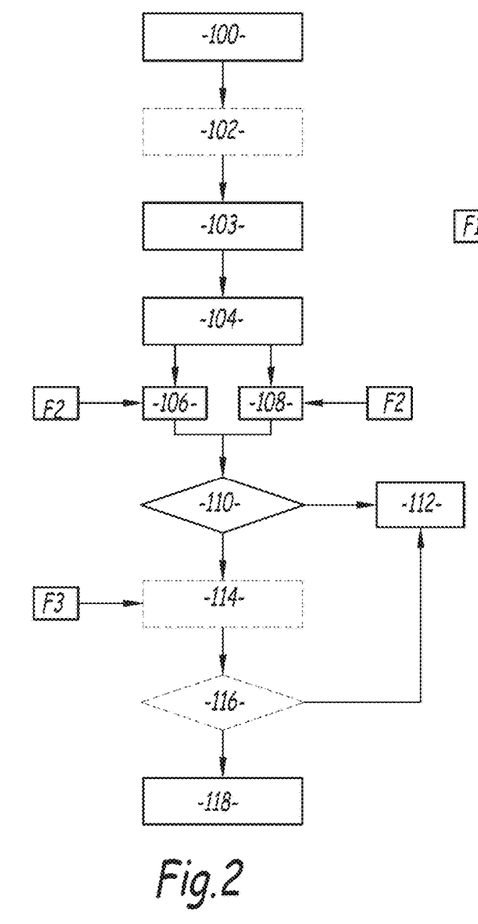
FIG. 2 is a flow chart of an example of a method for verification of a target computer file according to the invention by means of the tool of FIG. 1.

The medium 202 contains instructions for the execution of a method of verification of the target file T according to the method of FIG. 2. The unit 201 reads and executes the instructions contained in the medium 202 in order to carry out the method of FIG. 2. The interface 203 authorizes an exchange of data between the computer 30 and the tool 2, here, by means of the connector 21, compatible with the interface 303, in order to form a data link 210.

The interface 203 moreover authorizes an exchange of data between the tool 2 and a database 24 which contains the reference file REF. For example, the database 24 is part of a remote computer server of the tool 2 to which the latter has access by means of a local-area computer network.

The user interface 22 here is a man-machine interface and it comprises a display screen, as well as a data entry module.

The random number generator 23 is able to generate a random variable in the form of a random number or a pseudorandom number. Here, the generator 23 is implemented by the computer 20 in software manner to generate a pseudorandom number. As a variant, the random number generator 23 is a dedicated device for producing random numbers, also known as a "hardware random number generator". The random number generator 23, as a variant, may be situated outside the tool 2, for example, it may be implemented in a remote computer server.

Figure 3:
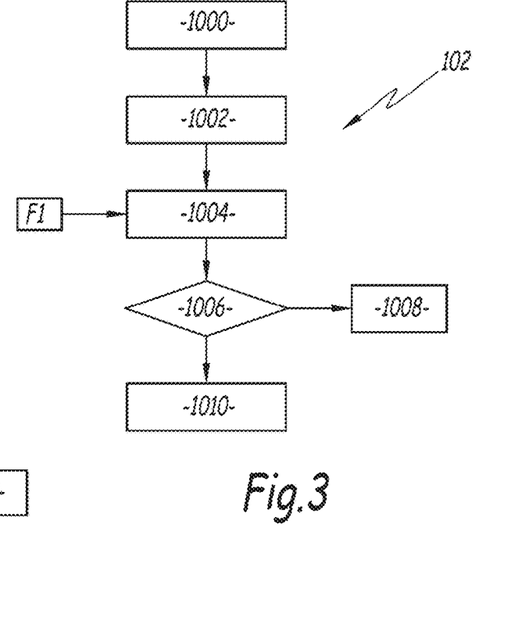
FIG. 3 is a flow chart of a step for authentication of a reference file implemented during the course of the method of verification of FIG. 2.

An example of the operation of the testing tool 2 is described below, making reference to the flow chart of FIG. 2 and with the aid of FIGS. 1, 3 and 4.

Initially, the device 3 to be tested is sampled from a series 3a of devices to be tested and then connected to the testing tool 2. In practice, the connector 21 is connected to the interface 303 and the data link 210 is established between the device 3 and the tool 2.

First of all, during a step 100, the reference file REF is automatically acquired, in the example, from the database 24.

Advantageously, the file REF is chosen from the database 24 as a function of attributes of the device 3. In fact, the testing facility 1 may be designed to test a large number of devices which may be of different nature, each one containing a different embedded software. The database 24 thus contains a plurality of files, each one playing the part of the reference file for a specific model or a specific version of the device 3. Here, each device 3 contains, for example in its memory 302, a predefined identifier, such as one in the form of a string of alphanumerical characters, which identifies the version of the software corresponding to the target file T. The identifier here is a version number of this software.

For this purpose, the step 100 involves an operation of acquisition of the identifier of the version of the file T. For example, the computer 20 sends, by the data link 210, a request to the computer 30 for the latter to return automatically the identifier which it contains. When this identifier is received, the computer 20 sends a request for automatic selecting with this identifier of the corresponding file REF in the database 24, with the aid of a predefined table of correspondence.

In this example, the step 100 is only carried out a single time for the entire series 3a, for example, during the verification of the first device 3 coming from this series 3a. Advantageously, this step 100 is not repeated then for each of the devices 3 of the series 3a, as long as the operation of the layout 1 has not been interrupted or a device from a series of devices to be tested other than the series 3a is tested on the layout 1.

As a variant, step 100 can be carried out several times for the same series 3a. Preferably, during a step 102 the authenticity of the acquired file REF is verified, as illustrated in FIG. 3. Here, this verification is done by means of a digital signature.

In this example, the digital signature is obtained previously by a digital signature method of public key cryptography, also known as asymmetrical cryptography. For example, a hash function F1 is applied to the reference file REF prior to its installation in the database 24, in order to provide a digital imprint, or "hash", of this reference file REF. For example, the hash function F1 is a cryptographic function belonging to the family of cryptographic functions SHA-2 or SHA-3. In this example, the hash function F1 is the function known as SHA-256, for "Secure Hash Algorithm". As is known, the digital imprint is a numerical value which is associated, ideally in unique fashion, with the reference file REF. In practice, however, it happens that the same numerical value may be associated with two different files, yet the probability of this happening is low.

The digital imprint so obtained is then encrypted by means of a private cryptographic key to generate the digital signature, for example, by means of the encryption algorithm RSA with a private cryptographic key having a length of 4096 bits. The digital signature generated, as well as the public cryptographic key associated with the private cryptographic key, are both generated by a management infrastructure system known as a "public key infrastructure", here being installed on the remote server.

During an operation 1000 of step 102, a digital signature and a public key are automatically acquired by the computer 20, for example, from the remote server.

Next, during an operation 1002, the digital signature acquired is automatically decrypted by the testing tool 2 with the aid of the public cryptographic key acquired during the operation 1000 and making use of a compatible decryption algorithm, so as to obtain the initially generated value of the digital imprint. This digital imprint is said to be decrypted.

Then, during an operation 1004, the testing tool 2 applies the same hash function F1 to the reference file REF acquired during step 100 in order to obtain a calculated digital imprint.

Afterwards, during an operation 1006, the calculated digital imprint is automatically compared with the decrypted digital imprint. If the calculated digital imprint is different from the decrypted digital imprint, this means that the computer file REF acquired during step 100 has been modified in unauthorized manner after its digital signature, which causes a major security problem. Consequently, during an operation 1008, the testing tool 2 transmits, via the user interface 22, a signal indicating the failure of the authentication of the reference file REF acquired. The latter cannot be used to verify the target file T. The method of verification of the target file T is then interrupted.

If the calculated digital imprint is equal to the decrypted digital imprint, then during an operation 1010 the acquired reference file REF is said to be authenticated. Step 102 is ended and the method of verification of the target file T continues.

As a variant, step 102 is omitted. According to another variant, the hash function F1 is omitted. The signature is then generated directly from the reference file REF and the operation 1004 is omitted.

Afterwards, during a step 103, illustrated in FIG. 2, the testing tool 2 automatically acquires a random variable, such as two random or pseudorandom numbers. For example, the testing tool 2 orders the generator 23 to generate two pseudorandom numbers. As a variant, only one random number is acquired.

Next, during a step 104, the computer 20 defines, as a function of the random variable acquired, a first area to be tested 202, delimiting a portion of the acquired reference file REF, and a second area to be tested, delimiting a portion of the target file T.

Figure 4:
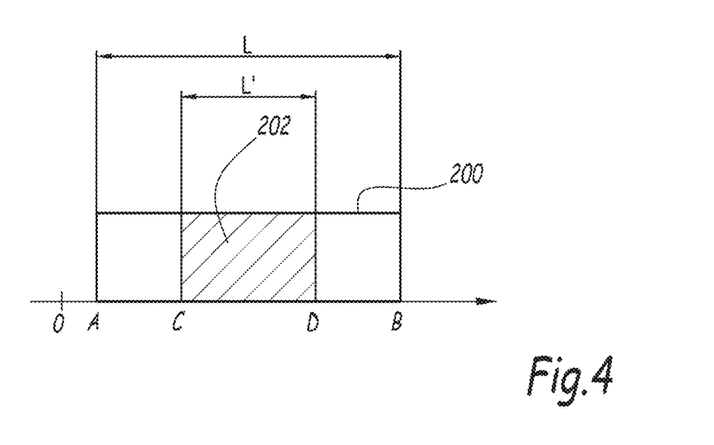
FIG. 4 is a schematic representation of an area to be tested of a computer file as defined in the course of the method of FIG. 2.

FIG. 4 illustrates an example of this first area to be tested.

As is known, when a computer file is stored inside a memory or a data recording medium, the data forming said file are associated with memory addresses which indicate the position of that data in the computer file.

In this example, the reference file REF extends continuously in a memory region 200 between the memory addresses A and B. The memory addresses are expressed in the form of a numerical value and are defined in relation to a reference address O. The total length L of the reference file REF is equal to the difference between the memory addresses B and A. For example, the total length L is equal to a megabyte.

The first area to be tested occupies a portion of the reference file REF corresponding here to an area 202 of the region 200. The area 202 extends here from a memory address C to a memory address D and has a size, or length L', which is defined as being equal to the difference between the memory addresses D and C. This length L' is strictly less than the total length L.

Advantageously, the area 202 has a length equal to or greater than 10% of the total length L, preferably equal to or greater than 20% of this total length L, even more preferably equal to or greater than 30% of this total length L. For example, the length L' is equal to 256 kilobytes, preferably it is equal to 512 kilobytes.

The length L' of the first area to be tested results from a compromise between the security requirements and the processing capabilities of the computer 30. In fact, the larger the length of the area to be tested the harder it is for an attacker to hide an unauthorized modification of the target file T, but with the drawback that the further calculation operations regarding this area to be tested will require sizeable computing resources.

In this example, the target file T has the same length as the reference file REF. If the target file T has a different length from the reference file REF, this generally indicates that the target file T has been modified.

The first area to be tested 202 is thus characterized on the one hand by its size, or length L', and on the other hand by the relative position which it occupies with respect to the reference file, this position being quantified by the difference between the memory addresses C and A.

The second area to be tested has a length which is the same as the length of the first area to be tested, namely, equal to the length L', and it is situated inside the target file T, in the same relative position with respect to the origin of this target file T as the first area to be tested is located within the reference file REF with respect to the origin of the reference file REF. This relative position is given by the difference between the memory addresses C and A. This relative position is noted as "C-A".

Thus, the attributes of the second area to be tested are normally the same as those of the first area to be tested. In fact, the second reference area is defined directly from the values of the length L' and the relative position C-A of the first reference area.

In this example, the computer 20 automatically generates the address value C corresponding to the origin of the area to be tested as well as the length L' of this area to be tested, as a function of the statistical randomness acquired during step 103. For example, one of the two random numbers is used to calculate the value of the address C and the second random number acquired is used to calculate the length L'.

For example, if the second random number leads to the determination of a length value L' which is not acceptable, for example, because it is too large or too small, that is, greater than the length L or less than 5% of the length L, then this random number is not accepted and a new random number is acquired. This operation can be repeated until obtaining a satisfactory value of the length L'. It is the same for the first random number, for example, if it leads to the determination of a memory address C outside the reference file, that is, one not belonging to the area 202.

As a variant, when only one random number is acquired, the area to be tested can be calculated by setting the length L' equal to a predefined value and randomly choosing the value of the relative position C-A based on the random variable generated.

Alternatively, it is the length L' which is chosen randomly based on the random variable generated and the relative position C-A which is set at a predefined value.

Next, during a step 106, as illustrated in FIG. 2, the computer 20 automatically calculates a first digital imprint, by application of a hash function F2, solely to the portion of the reference file REF which is contained inside the first area to be tested, that is, between the memory addresses C and D. For example, the first digital imprint is in the form of a numerical value with a size of at least 256 bits.

During a step 108, for example simultaneously with step 106, the computer 30 of the device 3 automatically calculates a second digital imprint, by application of the same hash function F2 solely to the portion of the target file T which is contained inside the second area to be tested.

For example, the computer 20 automatically sends a request for this purpose to the computer 30, by means of the link 210. This request in particular contains the attributes of the second area to be tested, as defined during the step 104, especially the values of the relative position "C-A" of the area to be tested as well as its length L' within the target file T. Thus, it is not necessary to transfer the target file T in its entirety to the computer 20, which would take too much time. For example, the calculation of the second digital imprint is done by a dedicated executable application recorded in the memory 302 of the computer 30. This calculation is thus performed on the device 3 to be tested.

Here, the hash function F2 is a cryptographic function belonging to the family of cryptographic functions SHA-2 or SHA-3. In this example, the hash function F2 is the function known as SHA-256.

The hash function F2 is not necessarily the same as the hash function F1 used during step 102. However, in practice, the hash functions F1 and F2 are the same, in order to limit the complexity of the computer 20.

As a variant, when the computer 30 has reduced performance, a hash function F2 requiring fewer computing resources is preferably used, such as a hash function of type CRC-16, for "cyclic redundancy check" or a check sum. This prevents the calculation of the second digital imprint from taking too much time and disturbing the course of the other testing operations on the testing facility 1.

The computer 30 thus performs this calculation of the second digital imprint on the file to be tested T, as a function of the characteristics of the second area to be tested, which have been transmitted to it by the computer 20.

Once this calculation of the second digital imprint has been done by the computer 30, the latter automatically relays, to the computer 20, the value of the second digital imprint as calculated by the computer 30.

Next, during a step 110, the computer 20 automatically compares the values of the first and second digital imprints calculated.

If the first and second digital imprints are different, this indicates that the target file T is different from the reference computer file. The verification is then said to have failed. The target file T is said to be nonverified. Then, during a step 112, the computer 20 automatically sends a signal indicating a failure, for example, to the user interface 22. Advantageously, a serial number of the tested device 3 is automatically recorded by the testing tool 2.

The device 3 is then disconnected from the testing tool 2, for example, by interrupting the data link 210 and disconnecting the connector 21 of the interface 303. Another device 3 of the series 3a is then sampled to be tested in turn by the testing tool 2.

In this example, if the first and second digital imprints are detected as being equal, then an additional step of verification is carried out during a following step 114.

During this step 114, third and fourth digital imprints are calculated, respectively, for third and fourth areas to be tested, respectively, of the reference file REF and the target file T. These third and fourth areas to be tested are respectively different from the first and second areas to be tested.

In this example, the third area to be tested extends over the entirety of the reference file REF, that is, between the memory addresses A and B. In analogous manner, the fourth area to be tested extends over the entirety of the target file T.

As a variant, the third and fourth areas to be tested may extend solely over a portion of the reference file REF and the target file T. For example, the third area to be tested is separate from the first area to be tested. As a variant, the joining of the third area to be tested and the first area to be tested occupies the entire length of the reference file. For this purpose, the step 114 involves supplemental steps of acquisition of a random variable and definition of the third and fourth areas to be tested, these steps being analogous to those carried out during steps 103 and 104, respectively, for the first and second areas to be tested. For example, the computer 30 automatically calculates a third digital imprint, by application of a hash function F3 to the entirety of the reference file REF. This hash function F3 here is identical to the hash function F2, although that is not necessarily the case. This calculation is done, for example, in a way analogous to that used for the first digital imprint during the previously described step 106.

During an additional comparison step 116, the values of the third and fourth digital imprints are automatically compared by the computer 20. If these third and fourth digital imprints are different from each other, this indicates that the target file T is different from the reference computer file REF, even though the comparison 110 did not reveal any differences between the first and second digital imprints. The previously described step 112 is then carried out.

Otherwise, if the third and fourth digital imprints are determined as being equal to each other, then the target file T is considered to be corresponding to the reference file and it is then said to be verified. Thus, the target file T here is only said to be verified if the first and second digital imprints are equal to each other and the third and fourth digital imprints are also equal to each other.

Next, during a step 118, the computer 20 generates a signal indicating that the verification of this target file T has concluded with success. For example, a message is automatically sent to the interface 22.

By randomly selecting the size and the position of the first and second areas to be tested, it is not possible for an attacker who wants to fraudulently modify the target file T to know in advance which portion of the target file T will be the subject of the verification. It is in fact physically impossible to modify the target file T so that the hash function F2 returns the expected value of the second digital imprint for all possible configurations of the first area to be tested, as there are so many of them. Thus, it is not possible to hide in this way a modification of the target file T. By adding additional verifications for the third and fourth areas to be tested, the probability of detecting such a modification in the rare case when such was not possible to be detected based on the first and second areas to be tested is further increased. Despite all this, the method of verification remains fast enough to be implemented in an industrial setting without detriment to the proper functioning and efficiency of the industrial manufacturing and/or testing processes.

Many other embodiments are possible.

For example, the step 114 of additional verification and the step 116 of additional comparison are omitted. In this case, at the end of the comparison 110, if the first and second digital imprints are equal to each other, then step 118 is carried out directly.

Steps 114 and 116 can be repeated several times, in order to define additional areas to be tested for the reference file REF and the target file T which are different from the first, second, third and fourth areas to be tested.

The method of verification of FIG. 2 can be used independently of the testing facility 1, in order to verify a target file other than an embedded software. For example, the target file T is a digital image or a multimedia content.

The variants and embodiments described above can be combined with each other to form new embodiments of the invention.

The invention claimed is:

1. A method for automatically verifying a target computer file with respect to a reference computer file, said method comprising:
   a) acquiring a reference computer file and the target computer file to be tested;
   b) acquiring at least one random variable;
   c) defining, as a function of the at least one random variable acquired:
      a first area to be tested delimiting a portion of the reference computer file, and
      a second area to be tested delimiting a portion of the target computer file, the second area to be tested exhibiting one and the same size as the first area to be tested and being situated, inside the target computer file, at the same relative position with respect to the origin of said target computer file as the first test area with respect to the origin of the reference computer file;
   d) calculating a first digital imprint, by applying a hash function solely to that portion of the reference computer file which is contained inside the first area to be tested;
   e) calculating a second digital imprint, by applying the same hash function solely to that portion of the target computer file which is contained inside the second area to be tested;
   f) automatically comparing the first and second digital imprints, the target computer file being termed verified when the first and second digital imprints are equal and being termed non-verified when the first and second digital imprints are different;

b') in response to the first and second digital imprints being equal and the target computer file being termed verified, acquiring at least one additional random variable; and c') in response to the first and second digital imprints being equal and the target computer file being termed verified, defining, as a function of the at least one additional random variable acquired, a third area to be tested, separate from the first area to be tested and delimiting an additional portion of the reference computer file, wherein joining of the first area to be tested and the separate third area to be tested occupies an entire length of the reference computer file.

2. The method of verification according to claim 1, wherein the first area to be tested has a length equal to or greater than 10% of the total length of the reference computer file.

3. The method of verification according to claim 1, further comprising:

c') defining, as the function of the at least one additional random variable acquired:
a fourth area to be tested, different from the second area to be tested and delimiting an additional portion of the target file, the fourth area to be tested having the same size as the third area to be tested and being situated, inside the target file, at the same relative position with respect to the origin of said target file as the third area to be tested with respect to the origin of the reference file;

d') calculating a third digital imprint, by applying a hash function solely to that portion of the reference computer file which is contained inside the third area to be tested;

e') calculating a fourth digital imprint, by applying the same hash function solely to that portion of the target computer file which is contained inside the fourth area to be tested; and f') automatically comparing the third and fourth digital imprints, the target computer file being then termed verified only when the third and fourth digital imprints are equal.

4. The method of verification according to claim 1, wherein step a) further includes verifying authenticity of the reference computer file acquired, said verifying of authenticity being performed using a digital signature.

5. The method of verification according to claim 1, wherein steps a), b), c), d) and f) are executed automatically by a testing tool, the target computer file is an embedded software, and is stored in a memory of a device to be tested, and the calculating of the second digital imprint is performed automatically by the device to be tested, and involves the automatic acquisition of the second digital imprint by the testing tool.

6. The method of verification according to claim 1, wherein the hash function used to calculate the first and second digital imprints is a cryptographic hash function.

7. A non-transitory data recording medium storing instructions, wherein the instructions, when executed by an electronic computer, cause the electronic computer to carry out the method of verification according to claim 1.

8. The method of verification according to claim 6, wherein the cryptographic hash function is a hash function of the family SHA-2 or SHA-3.

9. The method of verification according to claim 6, wherein the cryptographic hash function is hash function SHA-256.

10. The method of verification according to claim 1, wherein in response to the first and second digital imprints being different and the target computer file being termed non-verified, sending a signal indicating a verification failure, without acquiring the at least one additional random variable and without defining the third area to be tested.

11. An electronic computer comprising:
processing circuitry configured to
a) acquire a reference computer file and a target computer file to be tested,
b) acquire at least one random variable,
c) define, as a function of the at least one random variable acquired:
a first area to be tested delimiting a portion of the reference computer file, and
a second area to be tested delimiting a portion of the target computer file, the second area to be tested exhibiting one and the same size as the first area to be tested and being situated, inside the target computer file, at the same relative position with respect to the origin of said target computer file as the first test area with respect to the origin of the reference computer file,
d) calculate a first digital imprint, by applying a hash function solely to that portion of the reference computer file which is contained inside the first area to be tested,
e) calculate a second digital imprint, by applying the same hash function solely to that portion of the target computer file which is contained inside the second area to be tested,
f) automatically compare the first and second digital imprints, the target computer file being termed verified when the first and second digital imprints are equal and being termed non-verified when the first and second digital imprints are different,
b') in response to the first and second digital imprints being equal and the target computer file being termed verified, acquire at least one additional random variable, and
c') in response to the first and second digital imprints being equal and the target computer file being termed verified, define, as a function of the at least one additional random variable acquired a third area to be tested, separate from the first area to be tested and delimiting an additional portion of the reference computer file, wherein joining of the first area to be tested and the separate third area to be tested occupies an entire length of the reference computer file.

12. A testing tool to automatically verify, with respect to a reference computer file, a target computer file that is an embedded software, stored in a memory of a device to be tested, said testing tool comprising:
an electronic computer; and
a communication interface to exchange data with the memory of the device to be tested, wherein
the electronic computer includes processing circuitry configured to
a) acquire the reference computer file and the target computer file to be tested,
b) acquire at least one random variable,
c) define, as a function of the at least one random variable acquired:
a first area to be tested delimiting a portion of the reference computer file, and
a second area to be tested delimiting a portion of the target computer file, the second area to be tested exhibiting one and the same size as the first area to be tested and being situated, inside the target computer file, at the same relative position with respect to the origin of said target computer file as the first test area with respect to the origin of the reference computer file, d) calculate a first digital imprint, by applying a hash function solely to that portion of the reference computer file which is contained inside the first area to be tested, e) calculate a second digital imprint, by applying the same hash function solely to that portion of the target computer file which is contained inside the second area to be tested, f) automatically compare the first and second digital imprints, the target computer file being termed verified when the first and second digital imprints are equal and being termed non-verified when the first and second digital imprints are different, b') in response to the first and second digital imprints being equal and the target computer file being termed verified, acquire at least one additional random variable, and c') in response to the first and second digital imprints being equal and the target computer file being termed verified, define, as a function of the at least one additional random variable acquired a third area to be tested, separate from the first area to be tested and delimiting an additional portion of the reference computer file, wherein joining of the first area to be tested and the separate third area to be tested occupies an entire length of the reference computer file.

* * * * *